May 7, 1940.  E. H. PIRON  2,199,730
THERMOSTATIC CONTROL
Filed May 25, 1936
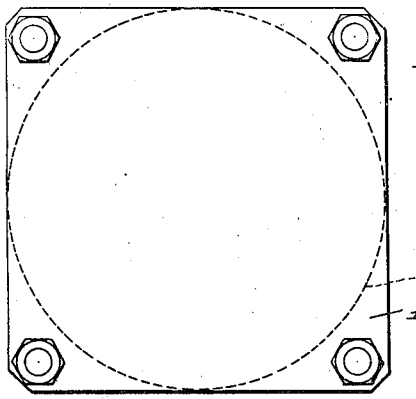
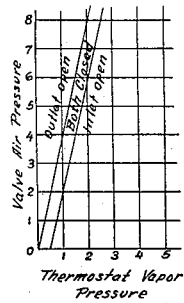
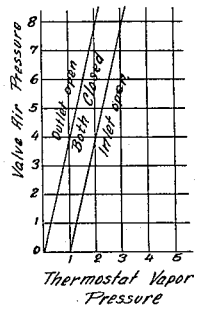
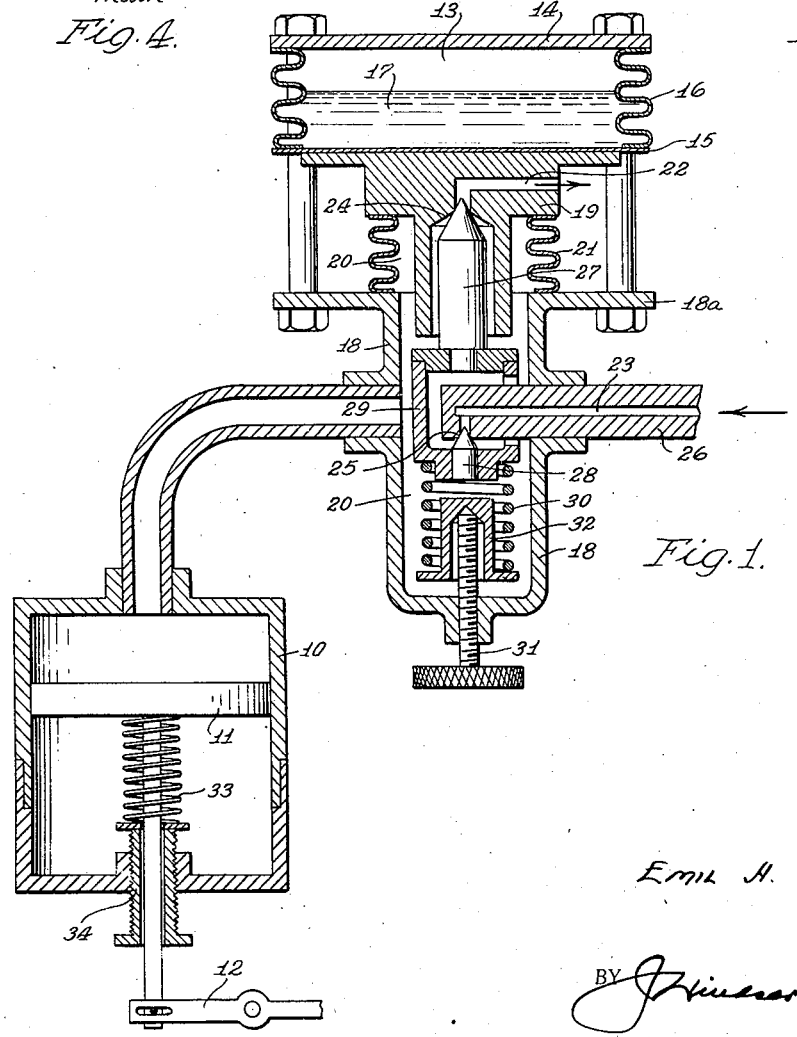
Emil H. Piron.
INVENTOR.
BY
ATTORNEY.

Patented May 7, 1940

2,199,730

UNITED STATES PATENT OFFICE 2,199,730

THERMOSTATIC CONTROL

Emil H. Piron, New York, N. Y., assignor to Transit Research Corporation, New York, N. Y., a corporation of New York Application May 25, 1936, Serial No. 81,680

5 Claims. (Cl. 236—86)

This invention relates to thermostatic controls, especially for air conditioning systems, and has as one of its principal objects to provide an automatic means for raising and lowering the fluid pressure in a chamber or system in response to the fluid pressure in a second chamber or system.

Another object of this invention is to provide a thermostatically controlled power operated means for automatically actuating the controls of a temperature regulating apparatus.

Another object of this invention is to provide a control means for temperature regulating apparatus which is powerful, simple, economical in first cost and in operation, durable, and rugged, and which will be especially suitable for use in vehicles such as street cars, railway rolling stock (such as passenger coaches and refrigerator cars), trucks, and buses.

Another object of this invention is to provide a simple means for controlling the pressure in a large substantially closed system in accordance with the pressure in a small system.

Another object of this invention is to provide a reliable and economical means for operating a damper or other control means in a heating and ventilating system in accordance with the temperature at some point which may be far from the damper.

Another object of this invention is to provide a remote control means responsive to a force which, as shown, is dependent upon temperature but which may be applied by a spring or any other resilient means.

In the drawing,

Figure 1 is a partly diagrammatic sectional view through one of the preferred embodiments of the invention.

Figure 2 is a plan view of part of the apparatus shown in Figure 1.

Figure 3 is a graph showing the operating characteristics of one embodiment of the invention with one adjustment of the device.

Figure 4 is a graph similar to Figure 3 with a different adjustment.

The particular embodiment of the invention shown in the drawing comprises a thermostatically operated double valve which controls the fluid pressure applied to a pressure responsive device (such as a cylinder 10 containing a piston 11) which determines the position of a temperature control member (such as a lever 12 connected to a damper) in accordance with the pressure applied to the pressure responsive device.

In the specific embodiment shown, the thermostatic means consists of a chamber 13 formed by two parallel plates 14, 15 and a metal bellows 16 connecting them, the chamber 13 being filled with a substance 17 which is partly in its vapor phase and partly in its liquid phase, so that the pressure in the chamber 13 is dependent only on its temperature and not on its volume. Suitable substances for this purpose are methyl chloride or butylene, which boil under atmospheric pressure at −5° F. and 24° F. respectively and which have, at ordinary atmospheric temperatures, vapor pressures which are substantially higher than atmospheric pressure and which vary considerably with changes in temperature.

One side of the thermostatic chamber 13 is fixed to a flange 18a on the body 18 of the valve and the other is secured to a floating wall member 19 movable with respect to the valve body 18, so that as the chamber 13 expands or contracts in volume, the floating wall member 19 will move in and out with respect to the valve body 18. The floating wall member 19 and the valve body 18 form part of the walls of a valve chamber 20, the remaining wall being formed by a metal bellows 21 joining the floating member 19 to the body 18. The floating wall member 19 and the side 15 of the thermostat chamber 13 to which it is fixed thus lie between and form part of the walls of two chambers 13 and 20, whose opposite walls 14 and 18 are fixed.

The floating wall member 19 is thus subjected to the pressures in the two chambers 13 and 20, or, more precisely, to forces created by and proportional to the pressures in the two chambers 13 and 20. These two forces oppose each other and are normally in substantial equilibrium. This equilibrium is maintained by increasing the pressure in the valve chamber 20 when a rise in temperature causes the pressure in the thermostat chamber 13 to rise and by decreasing the pressure in the valve chamber 20 when a drop in temperature causes the pressure in the thermostat chamber 13 to fall.

The means for increasing and decreasing the pressure in the valve chamber 20 in accordance with the pressure in the thermostat chamber 13 comprises two passages 22 and 23 which enter the valve chamber 20 and terminate in valve seats 24 and 25 facing away from the thermostat chamber 13. One passage 22 lies in the floating member 19 and provides a way for air to escape from the valve chamber when the pressure in it is to be reduced. The other passage 23 lies in a compressed air supply pipe 26 projecting through and fixed to the valve body 18 and provides a way for compressed air to enter the valve chamber 20. The two valve seats 24 and 25, in which these passages terminate, receive valves 27 and 28 which are rigidly secured together by a valve carrier 29 and are pressed towards their seats by a spring 30. With this arrangement, when the temperature of the thermostat 13 and the pressure within it drop, the pressure in the valve chamber 20 pushes the floating member 19 towards the thermostat 13 and away from the valve 27 resting on the outlet valve seat 24 in the floating wall member 19. The outlet valve 27 does not move with the floating member 19 because the two valves 27 and 28 are rigidly secured together and the other or inlet valve needle 28 is in contact with its valve seat 25 which faces away from the floating member 19 and hence prevents movement in that direction. The outlet or vent passage 22 is therefore opened, and air from the valve chamber 20 escapes through it until the pressure in the valve chamber 20 falls far enough to allow the pressure in the thermostat chamber 13 to move the floating member 19 to its original position.

When the temperature of the thermostat 13 and the pressure within it rises, the increased pressure pushes the floating member 19 toward the valve chamber 20, and the outlet valve 27 moves with and remains pressed against its seat 24 on the floating member 19. The outlet passage 22 therefore remains sealed, but the inlet valve 28 which is rigidly secured to the outlet valve 27 by the carrier 29, moves with the outlet valve 27 and the floating member 19 and is lifted off of its seat 25. This opens the inlet passage 23 and allows compressed air to enter the valve chamber 20 until the pressure in it becomes great enough to move the floating member 19 against the increased pressure in the thermostat 13 and back to its original position.

From the above it will be seen that the pressure in the valve chamber 20 will be automatically varied with the pressure in the thermostat chamber 13. The two pressures, measured in pounds per square inch, will vary together but will not necessarily be equal. This is true because it is not the pressures acting on the floating wall member 19, but the forces exerted by those pressures which substantially balance each other. The force pushing the floating member 19 toward the valve body 18 is equal to the area of the bottom plate 15 of the thermostat multiplied by the pressure within the thermostat chamber 13. The opposing force pushing the floating member 19 in the other direction is equal to the pressure of the air in the valve chamber 20 multiplied by the effective area of the valve chamber side of the floating member 19.

If, for example, the area of the bottom plate 15 of the thermostat is four square inches and the effective area of the floating wall member 19 is one square inch, the two forces mentioned above will just balance when the pressure per square inch of the air within the valve chamber 20 is four times as great as the pressure of the vapor 34 and liquid 33 within the thermostat chamber 13. Thus, if the thermostat pressure is one pound per square inch and the air pressure is four pounds per square inch, they will both exert forces of four pounds on the floating wall member 19 and be in equilibrium. If the temperature of the device drops a little, the pressure in the thermostat 13 will drop to less than one pound per square inch, and the air pressure under the floating wall member 19 will lift it away from the outlet valve 27, allowing the air to escape through the outlet passage 22, until the pressure of the air in the valve chamber 20 drops to four times the thermostat pressure.

If the pressure of the air is four pounds per square inch and the pressure in the thermostat 13 rises to above one pound per square inch to one and a half pounds per square inch, for example, the resultant forces on the floating wall member 19 will be four pounds and six pounds. The difference between these, namely two pounds, will be the force pressing the floating wall member 19 down on the outlet valve 27. If the spring 30 which presses the valve carrier 29 and the two valves 27 and 28 upwards is set to exert an effective force of four pounds, it will hold the outlet valve 27 up against the two pound force exerted on it by the floating wall member 19 and also press the inlet valve 28 onto its seat with a force of two pounds. Thus both valves will be tightly closed.

If the temperature of the device rises until the pressure in the thermostat 13 becomes greater than two pounds per square inch, for example, and the pressure of the air remains at four pounds per square inch, the force exerted by the thermostat on the floating wall member 19 will be greater than eight pounds, that is, greater than the sum of the force exerted by the air in the valve chamber 20 and the force exerted by the spring 30 and it will move the floating wall member 19 and the valve assembly 27, 28 and 29 downward. This movement will remove the inlet valve 28 from its seat and allow air to enter from the passage 23 until the pressure within the valve chamber 20 again becomes great enough to lift the floating wall member 19 to its original position, allowing the inlet valve 28 to reseat itself and cut off the inflow of air from the pipe 26.

With the dimension and spring adjustment assumed above, the graph forming Figure 3 shows the relation between the pressure of the vapor in the thermostat 13, the pressure of the air in the valve chamber 20, and the opening and closing of the two valves for all combinations of pressures. It may be seen from this graph that a change of four pounds per square inch in the pressure of the air controlled corresponds to a change in the pressure within the thermostat bellows of only one pound per square inch. In other words, the valve multiplies the pressure change four times.

The effective force of the spring 30, that is, the excess force of the spring 30 over the force necessary to hold the inlet valve 28 on its seat against the pressure of the air in the passage 23, provides a certain amount of "lost pressure," similar to lost motion, through which the pressure of the thermostat vapor can vary without affecting the valve 28. This "lost pressure" prevents the valve from operating with every minor variation in temperature and prevents "hunting" of the heating system of whose controls the valve may form a part.

The amount of "lost pressure" may be adjusted by changing the pressure of the spring 30 by means of an adjusting screw 31 which moves the spring seat 32. For example, if the effective spring pressure in the valve whose operation has been analyzed above is reduced to two pounds, the opening and closing of the valve will be according to the pressures shown in the graph forming Figure 4. It will be seen from that graph that the "lost pressure" is now only one-half of a pound per square inch. By changing the spring pressure, the "lost pressure" can be made whatever is desired. It is obvious that by changing the relative areas of the two bellows the pressure multiplying effect of the valve can be made whatever is desired, and the responsiveness to temperature changes can further be controlled by changing the characteristics of the liquid in the thermostat. It will be seen, therefore, that the characteristics of the valve can be varied to meet practically any set of conditions for which a valve of this general type is adapted.

The thermostatic double valve described above is a useful invention of itself, but it finds its greatest utility when combined with a pressure responsive temperature control means having some of the characteristics of the one illustrated diagrammatically in the drawing. In the particular arrangement illustrated, the movement of the piston 11 in the direction to increase the volume of the cylinder 10 is opposed by a spring 33, the force of which increases as the piston moves out. Thus, for every pressure in the cylinder 10, there will be a position at which the piston 11 will be in equilibrium. If the pressure increases, the piston 11 moves out until the spring 33 is compressed enough to counteract the increased pressure. Thus, for every pressure there is a corresponding position of the piston 11 and, accordingly, of the member 12 whose position it is desired to control. The sensitivity of the piston 11 to changes in air pressure can be made whatever is desirable by varying the area of the piston or the strength of the spring, and the position corresponding to any one pressure can be changed by the adjusting means 34.

What I claim is:

1. A thermostatic double valve comprising a cupshaped housing, a valve seat member, expansible and contractible sealing means between the housing and said valve seat member, said valve seat member being movable away from the housing by pressure within the housing and having a valve seat facing said housing, a second valve seat fixed to the housing and facing in the same direction as the first valve seat, a single movable means having portions adapted to fit on said valve seats, a spring connected to said means to press said portions onto said valve seats, means for adjustably changing the pressure of said spring, and means to press the said valve seat member towards the said housing with a force dependent upon temperature.

2. A thermostatic double valve comprising a housing, a member movable with respect to said housing, said member being subjected on one side to the pressure within the housing and on the other side to a force dependent upon the temperature, expansible and contractible sealing means between said member and said housing whereby said member moves outwardly of the housing in the presence of pressure in the housing, a pair of similarly directed valve seats formed one on said member and one on said housing, a pair of valve members secured together and adapted to bear on said valve seats, said valve members being movable with respect to said housing and said valve seat member, means to press said valve members toward said valve seats, and means for adjusting said last named means to delay opening of said valves for variable predetermined temperature changes.

3. A thermostatic double valve comprising a housing, a member movable with respect to said housing, thermostatic means for moving said member inwardly of the housing, sealing means between said member and said housing, said sealing means being expansible and contractible whereby said member may move outwardly of the housing in the presence of pressure in said housing, a pair of similarly directed valve seats formed one on said member and one of said housing, a pair of valve members secured together and adapted to bear on said valve seats, said valve members being movable with respect to said housing and said valve seat member, means to press said valve members toward said valve seats, and means for adjusting said last named means to delay opening of said valves for variable predetermined temperature changes, one of said valve seats and its cooperating valve closing member controlling the admission of fluid under pressure to said housing and the other of said valve seats and its cooperating valve closing member controlling the escape of fluid from the housing.

4. A thermostatic double valve comprising a housing, a member movable with respect to said housing, thermostatic means for moving said member inwardly of said housing, sealing means between said member and said housing, said sealing means being expansible and contractible whereby said member may move outwardly of the housing in the presence of pressure in said housing, a pair of similarly directed valve seats formed one on said member and one on said housing, a pair of valve members secured together and adapted to bear on said valve seats, said valve members being movable with respect to said housing and said valve seat member, means to press said valve members toward said valve seats, and means for adjusting said last named means to delay opening of said valves for variable predetermined temperature changes, said valve seats and said valve members being movable in a direction parallel to the direction of movement of said first mentioned movable member.

5. A thermostatic double valve comprising a housing, a member movable with respect to said housing, said member being subjected on one side to the pressure within the housing and on the other side to a force dependent upon temperature, sealing means between said member and said housing forming an enclosed chamber, said sealing means being expansible and contractible whereby said pressure within the housing moves said member outwardly and said force moves said member inwardly, a pair of valves, one controlling the admission, the other controlling the exhaust of fluid to and from said chamber respectively, one valve member of each of said valves being formed on said movable member, spring means urging said valves toward closed position, and adjustable means for changing the pressure of said spring.

EMIL H. PIRON.